US011163396B2

(12) United States Patent
Perez et al.

(10) Patent No.: US 11,163,396 B2
(45) Date of Patent: Nov. 2, 2021

(54) METHOD AND TOUCH INSTRUMENT FOR UPLINK-BASED ZERO ACTIVATION FORCE

(71) Applicant: Microsoft Technology Licensing, LLC, Redmond, WA (US)

(72) Inventors: Ahia Perez, Ramat Gan (IL); On Haran, Kfar Saba (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/371,078

(22) Filed: Mar. 31, 2019

(65) Prior Publication Data

US 2020/0293173 A1      Sep. 17, 2020

Related U.S. Application Data

(60) Provisional application No. 62/818,035, filed on Mar. 13, 2019.

(51) Int. Cl.
*G06F 3/0354* (2013.01)
*G06F 3/041* (2006.01)
*G06F 3/038* (2013.01)

(52) U.S. Cl.
CPC .......... *G06F 3/04162* (2019.05); *G06F 3/038* (2013.01); *G06F 3/03545* (2013.01);
(Continued)

(58) Field of Classification Search
CPC ... G06F 3/04162; G06F 3/03545; G06F 3/038
See application file for complete search history.

(56) References Cited

U.S. PATENT DOCUMENTS

| 9,357,493 B1* | 5/2016 | Butler | H04W 52/0254 |
| 2005/0170778 A1* | 8/2005 | Uchiyama | G06F 3/038 |
| | | | 455/41.2 |

(Continued)

OTHER PUBLICATIONS

"Bamboo-User Manual", Retrieved From: https://support.wacom.asia/sites/default/files/manuals_brochures/bamboo-user-manual-en_0.pdf, Retrieved On: Jan. 16, 2019, 98 Pages.
(Continued)

*Primary Examiner* — Alexander Eisen
*Assistant Examiner* — Cory A Almeida
(74) *Attorney, Agent, or Firm* — Fiala & Weaver P.L.L.C.

(57) ABSTRACT

Methods for uplink-based zero activation force are performed by systems and devices. A touch instrument interfaces with a touch device, and includes antennas that receive communication signals from the touch device. The touch instrument also includes a processing circuit that is electrically coupled to the antennas. The processing circuit determines an orientation of the touch instrument with respect to the touch device. A distance between the touch device and the touch instrument is then determined based on the orientation and a communication signal from the touch device received by the antennas, and an activation command is generated when the distance indicates a touch/contact. The activation command, transmitted to the touch device, causes the touch device to perform an inking operation. When the distance determined indicates a hover, and not touching/contact, a deactivation command is generated. Distance is also determined based on touch instrument orientation.

20 Claims, 6 Drawing Sheets

(52) U.S. Cl.
CPC ............... *G06F 2203/0384* (2013.01); *G06F 2203/04108* (2013.01)

(56) References Cited

U.S. PATENT DOCUMENTS

| | | |
|---|---|---|
| 2006/0250381 A1 | 11/2006 | Geaghan |
| 2008/0012835 A1 | 1/2008 | Rimon et al. |
| 2009/0078474 A1 | 3/2009 | Fleck et al. |
| 2013/0207925 A1 | 8/2013 | Ryshtun et al. |
| 2013/0300670 A1 | 11/2013 | Besperstov et al. |
| 2014/0092069 A1 | 4/2014 | Bentov |
| 2016/0077611 A1 | 3/2016 | Katsurahira et al. |
| 2016/0085356 A1 | 3/2016 | Stern |
| 2016/0124528 A1* | 5/2016 | Feng .................. G06F 3/03545 345/179 |
| 2017/0329952 A1* | 11/2017 | Take ....................... G06F 21/36 |
| 2017/0364167 A1 | 12/2017 | Ribeiro et al. |
| 2018/0299976 A1 | 10/2018 | Chiewcharnpipat et al. |

OTHER PUBLICATIONS

"International Search Report and Written Opinion Issued in PCT Application No. PCT/US20/021057", dated Jun. 9, 2020, 12 Pages. (MS# 405899-WO-PCT).

\* cited by examiner

METHOD AND TOUCH INSTRUMENT FOR UPLINK-BASED ZERO ACTIVATION FORCE

CROSS-REFERENCE TO RELATED APPLICATION(S)

This application claims priority to U.S. Provisional Application No. 62/818,035, filed on Mar. 13, 2019, and entitled "METHOD AND TOUCH INSTRUMENT FOR UPLINK-BASED ZERO ACTIVATION FORCE," the entirety of which is incorporated by reference herein.

BACKGROUND

User interfaces such as touch interfaces allow users to select displayed content, write, draw, shade, etc., by the use of touch instruments. Some touch instruments include force sensors that differentiate between levels of force applied to the touch interface via the touch instruments. Applications may enable different effects based on the force applied, such as inking versus shading for a drawing application when positive force is applied, and no effect when zero force is applied when the touch instrument is hovering. Due to malfunctions, friction, wear on force sensors, etc., positive forces can be detected when touch instruments are hovering which causes effects to happen when they are not desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for uplink-based zero activation force are performed by systems and devices. Uplink-based zero activation force may be performed using different types of touch instruments, including but not limited to, a touch pen, a stylus, a light pen, etc. In embodiments, a determination of distance between the touch instrument and the touch device may be used to determine if the touch instrument is touching or hovering. For instance, a touch instrument may be held and wielded by a user to interface with a touch device to perform functions such as selecting objects, writing/inking, shading (e.g., low force inking), and/or the like. Touch instruments may include antennas that receive communication signals from the touch device, as well as a processing circuit(s) electrically coupled to the antennas. The processing circuit determines an orientation of the touch instrument with respect to the touch device. Orientations may be determined based on energies of communication signals received at the antennas from the touch device. A current distance between the touch device and touch instrument may be determined based on an orientation and energies of communication signals from the touch device received by the antennas. An activation command may be generated when the distance indicates a touch/contact between the touch instrument and the touch device. The activation command, transmitted to the touch device, causes the touch device to perform an inking operation. When the distance determined indicates a hover, and not touching/contact, a deactivation command is generated.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 5A, 5B, 5C, and 5D show diagrams of force characteristics and distance for uplink-based zero activation force, in accordance with example embodiments.

Figure 1A:
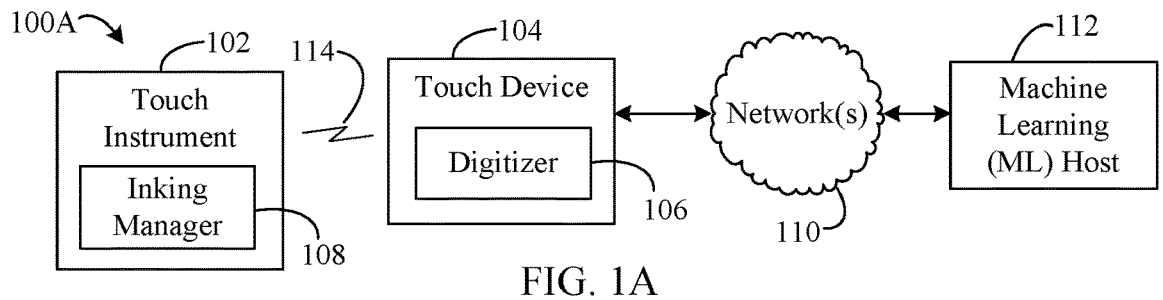
FIG. 1A shows a block diagram of a system for uplink-based zero activation force, according to an example embodiment.
Figure 1B:
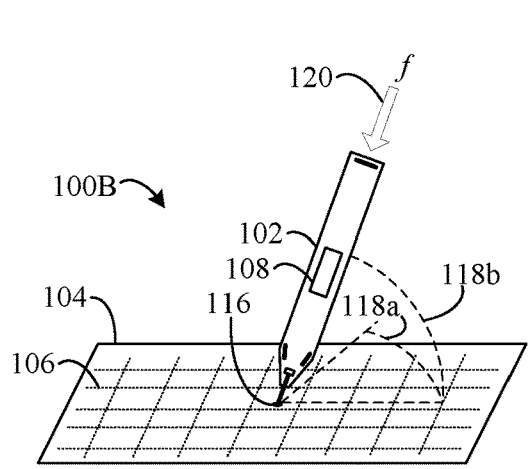
FIGS. 1B and 1C show diagrams of touch instruments for uplink-based zero activation force, according to example embodiments.
Figure 1C:
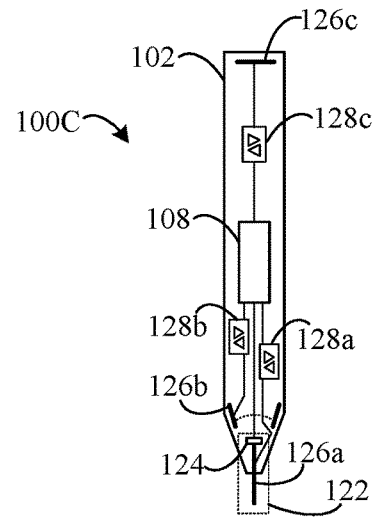
Figure 6A:
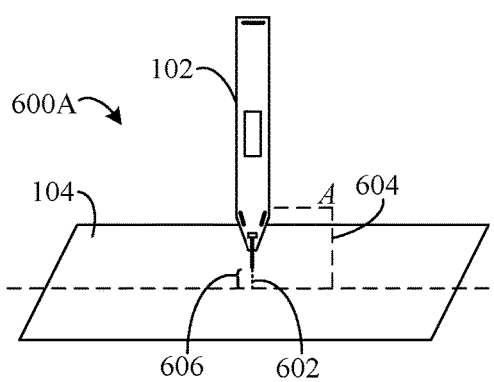
Figure 6B:
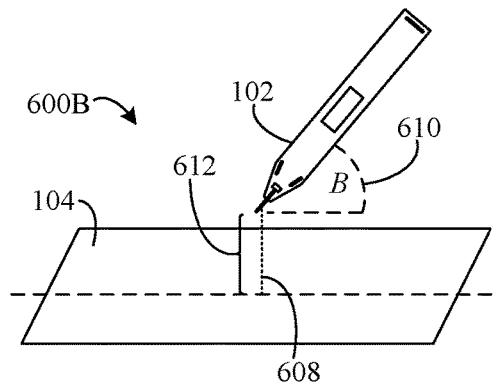

FIGS. 6A and 6B show diagrams of orientations and signal energy received by the touch instruments of FIGS. 1A-1C for uplink-based zero activation force, in accordance with example embodiments.

Figure 7:
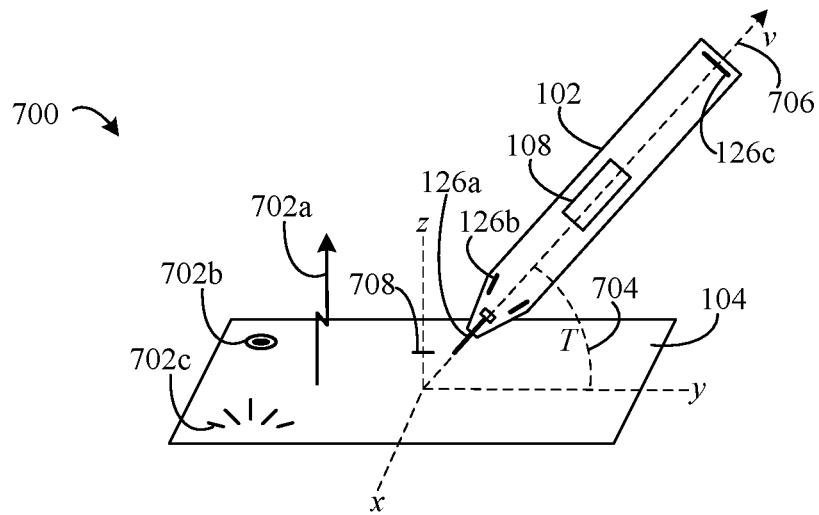

FIG. 7 shows a diagram of a system for distance calculation based on orientation and signal energy received by the touch instruments of FIGS. 1A-1C for uplink-based zero activation force, in accordance with an example embodiment.

Figure 8:
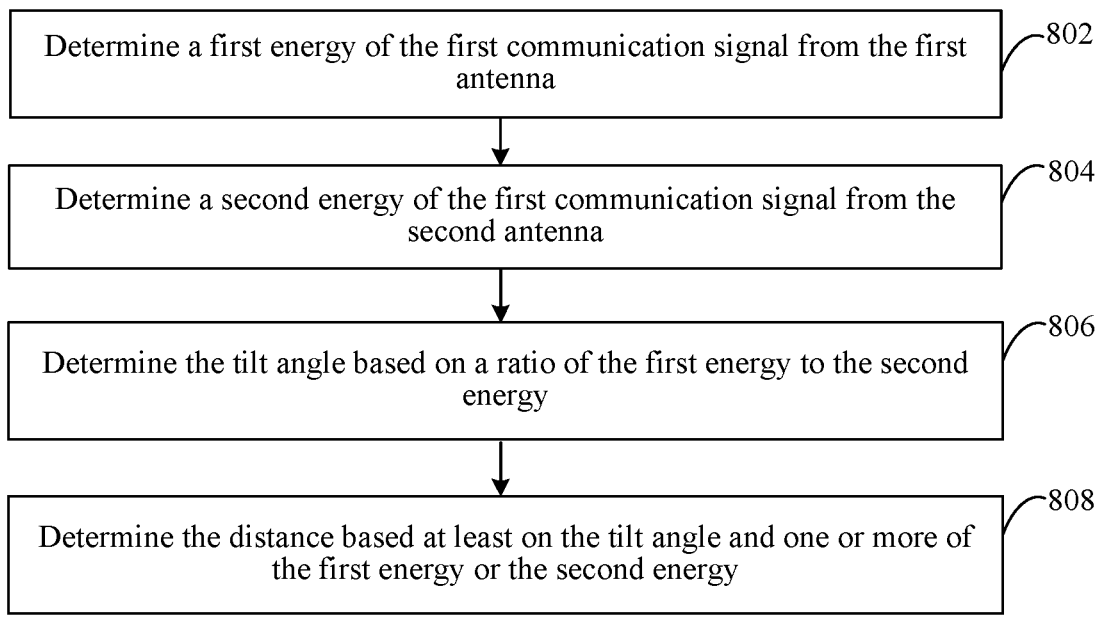

FIG. 8 shows a flowchart for uplink-based zero activation force, in accordance with an example embodiment.

Figure 9:
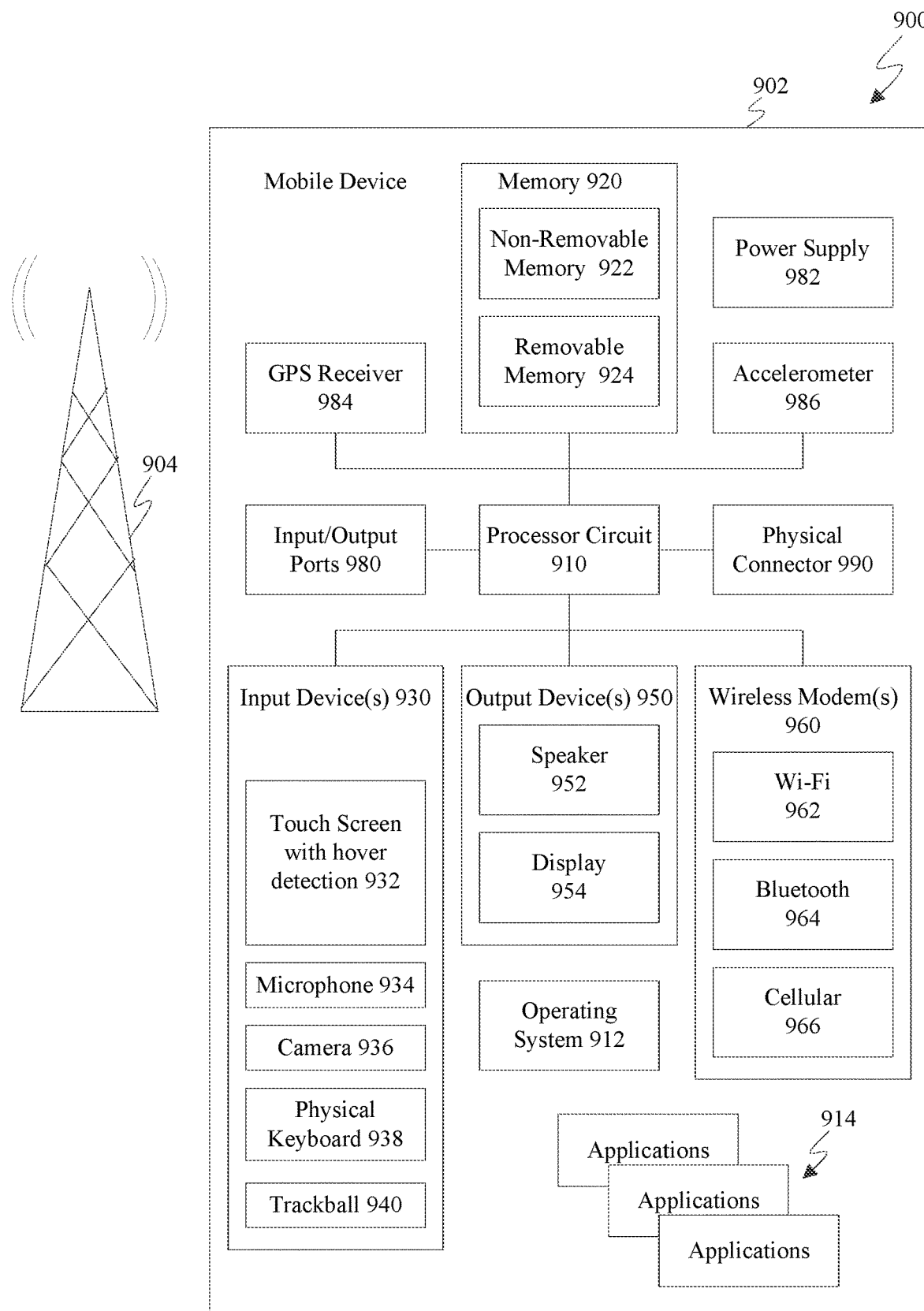

FIG. 9 shows a block diagram of an example mobile device that may be used to implement various example embodiments.

Figure 10:
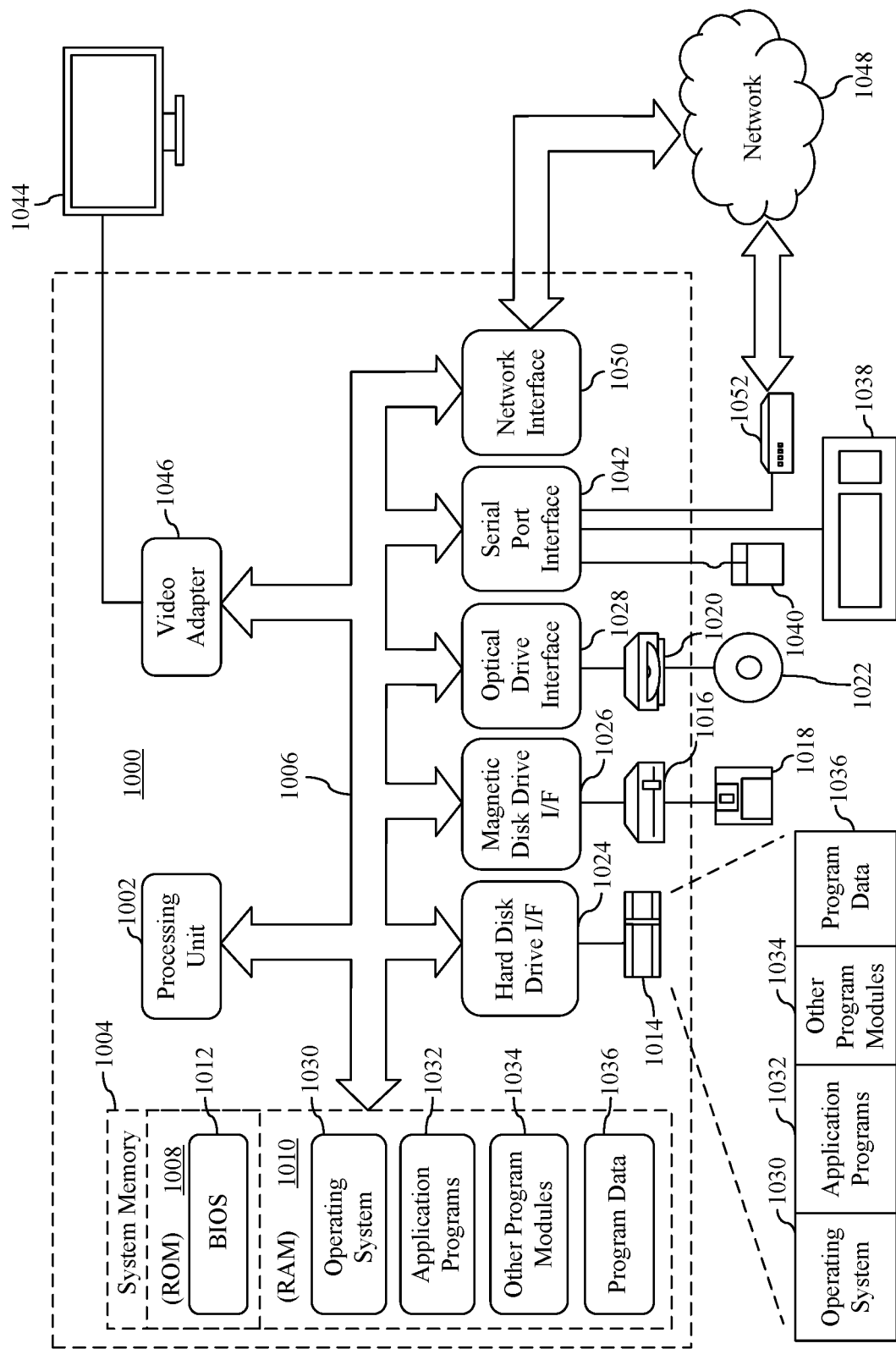

FIG. 10 shows a block diagram of an example computing device that may be used to implement embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for uplink-based zero activation force. Section III below describes example mobile device and computing device embodiments that may be used to implement features of the embodiments described herein. Section IV below describes additional examples and advantages, and Section V provides some concluding remarks.

II. Example Embodiments for Enhancing Touch Selections for Content

Methods for uplink-based zero activation force are performed by systems and devices. A determination of distance between a touch instrument and a touch device may be based on received communication signal energies that are used to determine if the touch instrument is touching or hovering. For instance, touch instruments may include antennas that receive communication signals from the touch device, as well as a processing circuit(s) electrically coupled to the antennas. The processing circuit may be configured to determine an orientation of the touch instrument with respect to the touch device based on energies of the communication signals received at the antennas. A current distance between the touch device and touch instrument may be measured based on the determined orientation and the energies of communication signals from the touch device. An activation command may be generated when the distance indicates a touch/contact between the touch instrument and the touch device. The activation command, transmitted to the touch device, causes the touch device to perform an inking operation. When the distance determined indicates a hover, i.e., no touching/contact, a deactivation command is generated is transmitted to the touch device to prohibit inking operations.

Touch instruments may include, without limitation, a touch pen, a stylus, a light pen, a wearable device for a user's finger, a glove, etc. Touch instrument may be held and wielded by a user to interface with a touch device to perform functions such as selecting objects, writing/inking, shading (i.e., low force inking), erasing, and/or the like. For example, when the touch instrument is in contact with the touch device, inking operations may be desired by the user, but when the touch instrument hovers above the touch device, the user may desire inking operations to cease. Additionally, different levels of force applied by the user through the touch instrument may be used for different inking operations. A force above a first threshold may indicate inking or erasing, while a force below the first threshold and above a second threshold may indicate low force inking such as shading.

Current solutions for touch instruments provide signals to touch devices to perform inking operations when a force is applied to the tip of the touch instrument on the screen/surface of the touch device. That is, when the touch instrument detects an indication of positive force applied from a force sensor in the tip of the touch instrument, information regarding the force is transmitted to a digitizer of the touch device through an electrostatic link, and inking is performed. For these touch instruments to discriminate between hovering (i.e., no contact with the touch device) and inking on the screen/surface (i.e., during contact with the touch device), the touch instrument relies on information from the force sensor coupled to the tip. However, there are scenarios where the measured force from the force sensor does not provide an accurate indication of the contact between the touch instrument and the touch device, e.g., in situations when the force sensor does not return exactly to its base state after force is no longer applied for inking (i.e., during hover). This issue may be caused by mechanical imperfections in the touch instrument, friction, wear on components, contamination of the sensor mechanism, and/or the like. Some effects related to this issue are described in further detail below.

Embodiments herein provide systems and methods in touch instruments that mitigate and/or eliminate these issues. For instance, as noted above, systems in touch instruments according to the instant embodiments utilize received energies from communication signals of touch devices to determine orientations of the touch instruments with respect to the touch devices, and then determine the distance between the touch instrument and the touch device based on the orientation and the energies. The determined distance thus provides an indication as to whether contact is being made with a touch device by the touch instrument, or whether the touch instrument is hovering above the touch device. The described embodiments may also be used in conjunction with a force sensor.

The embodiments herein also allow for a touch instrument to identify very low forces applied on the tip, e.g., 1-2 grams, for inking operations to be initiated, which allows for more reliable indications that different types of inking operations (e.g., full inking versus shading) are desired. Additionally, touch instruments do not perform inking when not touching the touch device even when a malfunctioning force sensor of the touch instrument indicates touching occurs. Accordingly, these embodiments for uplink-based zero activation force providing an improved inking experience, as well as improved touch instrument operation, including but not limited to, reducing the required force that the user needs to apply for the pen to ink and shade.

In other words, the embodiments disclosed herein provide for an uplink-based zero activation force in touch instruments that improve the functioning thereof. These and further embodiments are described in greater detail as follows.

Systems and devices may be configured in various ways for uplink-based zero activation force. For instance, FIG. 1A is a block diagram of a system 100, according to embodiments. System 100A is configured to enable for uplink-based zero activation force, according to embodiments. As shown in FIG. 1A, system 100A includes a touch instrument 102, a touch device 104, and a machine learning (ML) host 112. In embodiments, touch instrument 102 and touch device 104 may communicate with each other via communication signals 114, and touch device 104 and machine learning host 112 may communicate with each other over a network 110. It should be noted that various numbers of touch instruments, touch devices, and/or ML hosts may be present in various embodiments. Additionally, any combination of the components illustrated in FIG. 1A may be present in system 100A, according to embodiments.

As noted above, touch device 104 and ML host 112 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

ML host 112 may comprise one or more server computers or computing devices, which may include one or more distributed or "cloud-based" servers. In embodiments, ML host 112 may be associated with, or may be a part of, a cloud-based service platform such as Microsoft® Azure® from Microsoft Corporation of Redmond, Wash. Touch devices such as touch device 104 may be configured to provide information associated with uplink-based zero activation force activations and/or deactivations (including but not limited to: orientations, distances, received communication signal energies, sensor-detected forces, and/or the like) to ML host 112 via network 110. ML host 112 may be configured to train/re-train/generate models, algorithms, lookup tables, etc., for activation and/or deactivation of inking operations using machine learning techniques based on the information received from the touch devices. In embodiments, neural networks may be implemented by ML host 112.

It should be noted that as described herein, embodiments of ML host 112 are applicable to any type of system where a system for machine learning communicates with client devices over a network. One example noted above is where ML host 112 is a "cloud" implementation, application, or service in a network architecture/platform. A cloud platform may include a networked set of computing resources, including servers, routers, etc., that are configurable, shareable, provide data security, and are accessible over a network such as the Internet. Cloud applications/services such as for machine learning may run on these computing resources, often atop operating systems that run on the resources, for entities that access the applications/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Touch device 104 may be any type of computing device or computing system having an integrated touch interface or a peripheral touch interface, e.g., a touch screen or touch pad, that interfaces with or comprises a digitizer 106 associated therewith for interaction with touch instruments. Touch device 104 may be, without limitation, a terminal, a personal computer, a laptop computer, a tablet device, a smart phone, a personal digital assistant, a game console or gaming device, a television, and/or the like that may be utilized by users through interaction with touch instruments, such as touch instrument 102, to perform inking operations. For instance, touch instrument 102 may be utilized via the touch interface and digitizer 106, e.g., by contact/interaction provided at a touch screen, to perform inking operations.

Digitizer 106 may comprise a controller, one or more antennas, and/or the like. Digitizer 106 may be configured to receive/transmit communication signals via an antenna(s) from/to touch instrument 102 according to embodiments. A controller or processor of digitizer 106 may receive commands and information from touch instrument 102 to determine if and/or where inking operations are to be performed and provided to the user via a user interface (UI), e.g., on a display, a touch screen, and/or the like. For example, touch devices described herein may be configured to execute software applications that cause content to be displayed to users via UIs associated with touch interfaces. Such software applications may also enable users to provide selection indicia for content, to perform inking operations, etc., via touch interfaces and touch instruments, as described above.

As illustrated, touch instrument 102 may include an instance of an inking manager 108. Inking manager 108 is configured to perform operations for enhancing touch selections for content, as described in further detail below. For example, when a user interacts with a touch interface of touch device 104, e.g., via digitizer 106, using touch instrument 102 to perform inking operations, inking manager 108 is configured to receive communication signal information via one or more antennas of touch instrument 102 and/or a hardware-based force sensor, and to determine characterization information of touch instrument 102 for inking operation decisions. As noted above, a distance between touch instrument 102 and touch device 104 may be determined as a basis for performing or prohibiting inking operations. For instance, different amounts/types of inking may be performed based on the distance between touch instrument 102 and touch device 104, e.g., full inking, light inking or shading, erasing, no inking, etc., based on the characteristics/orientation and distance of touch instrument 102 with respect to touch device 104.

Inking manager 108 may be implemented in hardware, custom hardware, hardware combined with one or both of software and/or firmware, and/or as program instructions encoded on computer-readable storage media, and may be configured to perform any functions and/or operations described herein for uplink-based zero activation force in touch instruments. In embodiments, such functions and/or operations may be performed based on one or more lookup tables stored in a memory (not shown, but described below) of touch instrument 102. Lookup tables may be generated by touch instrument 102, or may be provided to touch instrument 102 via any communication link from touch device 104 and/or via a Wi-Fi connection or the like from ML host 112.

Turning now to FIGS. 1B and 1C, diagrams of touch instruments for uplink-based zero activation force, according to example embodiments. FIG. 1B shows a system 100B that includes touch instrument 102 of FIG. 1A, as well as touch device 104 and digitizer 106. FIG. 1C shows a system 100C that includes further details and features of touch instrument 102.

In system 100B, touch instrument 102 is illustrated as interfacing with antennas of digitizer 106 and with a screen of touch device 104. Touch instrument 102 may be held by a user at various distances, with various characteristics, and/or with various orientations with respect to touch device 104 (and digitizer 106). For instance, touch instrument 102 is illustrated in system 100B as being used by a user and that is interacting with touch device 104 at a location 116 with a force 120 (or pressure) being applied. In embodiments, location 116 may correspond to content displayed by, or a location for inking operations to be performed on, touch device 104. The distance of touch instrument 102 above touch device 104 at location 116 may be zero or approximately zero when force 120 is detected as being greater than zero (or approximately greater than zero, e.g., $f>2$ grams), while when force 120 is less than approximately 2 grams (or about zero), the distance between location 116 and touch instrument 102 may be greater than zero (i.e., no contact, or hovering). Force 120 may vary in a way corresponding to different inking operations the user desires to perform. For instance, a user may press harder with more force 120 through touch instrument 102 to apply full inking, or conversely, may apply less force 120 to apply light inking or shading. These interactions through force applied, and changes thereof, described herein may be determined and/or identified by inking manager 108.

Touch instrument 102 may also have an orientation with respect to the surface of touch device 104 (e.g., with respect to the plane in which the illustrated antennas of digitizer 106 reside). An axis corresponding to the length of touch instrument 102 may be indicative of the orientation thereof. Such an axis may be defined by an azimuth angle 118a and a longitudinal angle 118b. It should be noted that the reference point (i.e., location 116) shown for determining the values of azimuth angle 118a and longitudinal angle 118b with respect to touch device 104 is illustrative only, and is not to be considered limiting. Any reference point of touch device 104 may be used for determining orientations, according to embodiments. Orientations may be changed by altering one or more of azimuth angle 118a and/or longitudinal angle 118b. In embodiments, a given orientation of touch instrument 102 causes more or less of touch instrument 102 to be horizontally aligned to (e.g., be closer to, or further from, parallel with) the plane of the antennas of digitizer 106. Accordingly, the orientation of touch instrument 102 corresponds to the exposure of antennas of touch instrument 102 with communication signals transmitted by the antennas of touch device 104, due to capacitance between the two, and thus different communication signal energies may be determined by inking manager 108 for different orientations of touch instrument 102.

System 100C of FIG. 1C shows touch instrument 102, including inking manager 108, as well as sensors and antennas of touch instrument 102, according to an example embodiment. For instance, touch instrument 102 may include one or more antennas shown in system 100C as an antenna 126a (e.g., a tip antenna), an antenna 126b (e.g., a tilt antenna), and an antenna 126c (e.g., a tail antenna). Each antenna may be configured to transmit and/or receive communication signals to and/or from a touch device, such as touch device 104, via one or more respective transceivers: a transceiver 128a, a transceiver 128b, and a transceiver 128c. In embodiments, these transceivers may be a portion of inking manager 108, and antenna 126a, antenna 126b, and antenna 126c may be electrically coupled to inking manager 108 via these transceivers, respectively, as illustrated.

As noted above, different areas for each of antenna 126a, antenna 126b, and antenna 126c may be exposed to communication signals from digitizer 106 based on the capacitance related to the exposed areas. Thus, the energy (e.g., electrostatic energy) of the communication signals received may be utilized to differentiate orientations and distances as described herein. As illustrated, each antenna may have a different alignment with respect to touch instrument 102: antenna 126a may be parallel to the axis of touch instrument 102, antenna 126c may be perpendicular to the axis of touch instrument 102, and antenna 126b may be at an angle that is neither parallel nor perpendicular to the axis of touch instrument 102.

Touch instrument 102 may also include a hardware-based force sensor 122. Force sensor 122 may comprise a tip that includes antenna 126a and a sensor portion 124. Sensor portion 124 is configured to sense a force applied to the tip through user interactions with touch instrument 102. Sensor portion 124 may be electrically coupled, and configured to provide indicia of forces sensed thereby, to inking manager 108, according to embodiments.

In embodiments, touch instrument 102 may be initially calibrated to determine a baseline distance or height with respect to touch device 104. For example, a user may initiate contact of touch instrument 102 with touch device 104 and execute a calibration function according to the embodiments herein for determining distances, where the distance for the calibration is known to be zero. Calibrations thus allow orientations and communication signal energies to be determined for a zero distance, and results of calibrations may be stored in lookup tables, as described herein. Calibrations may be performed at different orientations, and may be performed periodically and/or when desired by the user or determined by either of touch instrument 102 and touch device 104.

Figure 2:
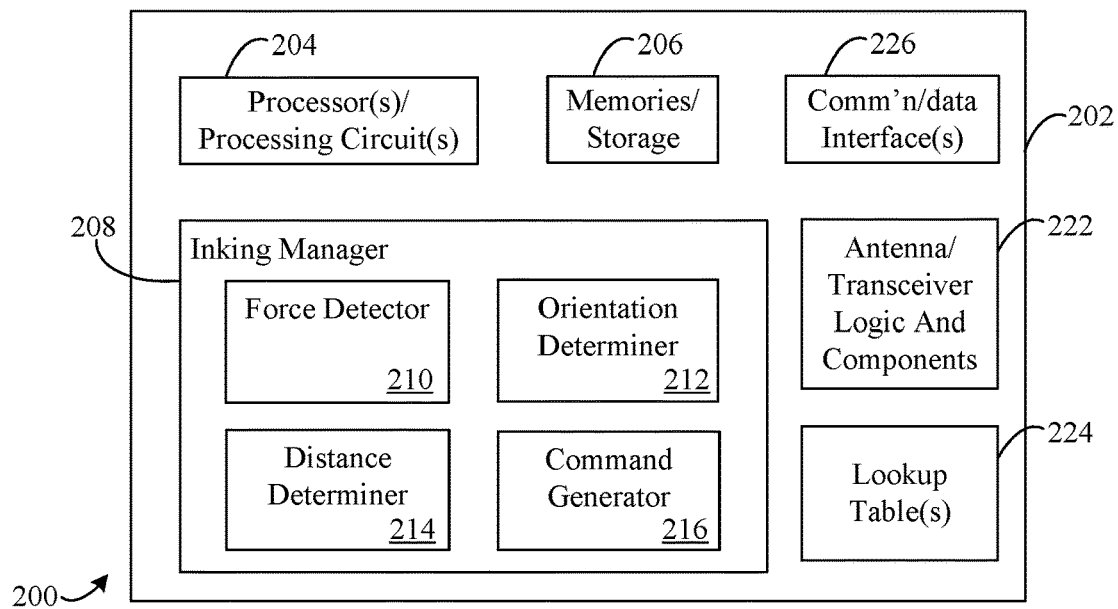
FIG. 2 shows a block diagram of a system for uplink-based zero activation force, according to an example embodiment.

Accordingly, a touch instrument, such as touch instrument 102, may be configured in various ways for improvements and enhancements in touch instruments via uplink-based zero activation force. For example, FIG. 2 is a block diagram of a system 200 configured for such improvements and enhancements. As shown, system 200 may be an embodiment of system 100A of FIG. 1, system 100B of FIG. 1B, and/or system 100C of FIG. 1C, including touch instrument 102 and inking manager 108. System 200 is described as follows.

System 200 includes a touch instrument 202, which may be an embodiment of touch instrument 102 of FIGS. 1A-1C, and may be any type or style of touch instrument, as mentioned elsewhere herein, or as otherwise known. As shown in FIG. 2, system 200 and touch instrument 202 include one or more of a processor (hereinafter "processor") 204 (including processing circuits), one or more of a memory and/or other physical storage device ("memory") 206, one or more communication/data interfaces ("interface") 226, and an inking manager 208 that may be an embodiment of inking manager 108 of FIGS. 1A-1C. System 200 may also include antenna/transceiver logic 222, and lookup table(s) 224 which may be stored in memory 206. System 200 may also include additional components (not shown for brevity and illustrative clarity) including, but not limited to, components and subcomponents of other devices and/or systems herein (e.g., force sensor 122, shown in FIG. 1C), as well as those described below with respect to FIGS. 10 and 11, such as an operating system, basic input/output system (BIOS), etc.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories, etc. Processor 204 comprises circuitry that is configured to execute computer program instructions such as but not limited to embodiments of inking manager 208, which may be implemented as computer program instructions for uplink-based zero activation force, etc., as described herein. Memory 206 is configured to store such computer program instructions/code, as well as to store other information and data described in this disclosure including, without limitation, lookup tables, calibration information, etc.

Interface 226 may include any type or number of wired and/or wireless network adapter, modem, etc., configured to enable system 200 to communicate with other devices over a network, such as communications between system 200 and other devices utilized in a network as described herein over a network such as network 110 as described above with respect to FIG. 1A. Interface 226 may include hardware and/or software and may support any type of input devices, sensors, and touch instruments used for wired and/or wireless communications, such as an electronic pen, a stylus, a light pen, force sensors, a mouse, a touch screen, a touch pad, a microphone, a camera, a kinetic sensor, a physical keyboard, a trackball, gloves, other wearables or sensors, etc., and/or the like. In embodiments, interface 226 may comprise both input and output portions. For example, Wi-Fi, Bluetooth®, and other types of radio frequency communication signals may be supported by interface 226, in embodiments. Additional input/output functions may also be supported by interface 226 as described below with respect to FIGS. 10 and 11.

Antenna/transceiver logic 222 may be configured to receive and/or transmit communication signals of various types and protocols from and/or to antennas of touch devices, e.g., such as antennas 126a-126c of FIG. 1C. In embodiments, antenna/transceiver logic 222 may include such antennas and/or transceivers 128a-128c of FIG. 1C. Antenna/transceiver logic 222 may be configured to quantify communication signal energies received at touch instrument 202 and provide such information to inking manager 208. In embodiments, antenna/transceiver logic 222 may be part of, or work in conjunction with, interface 226 for transmitting/receiving communication signals with a touch device such as touch device 104 described above.

Lookup table(s) 224 may include, without limitation, one or more tables that store relationships between orientations, distances, communication signal energies, etc. Lookup table(s) 224 may be stored in memory 206j, and may be referenced by processor 204 and/or inking manager 208 for determinations of distances, orientations, and/or the like for embodiments herein. Accordingly, the processing operations of touch instrument 202 are more efficient and faster due to the utilization of the highly-repeatable nature of orientation and distance determinations described herein. Lookup table(s) 224 may be dynamically created and/or updated, or may be predetermined.

Inking manager 208 includes a plurality of components for performing the functions and operations described herein for uplink-based zero activation force in touch instruments. As shown, inking manager 208 includes a force detector 210, an orientation determiner 212, a distance determiner 214, and a command generator 216. While shown separately for illustrative clarity, in embodiments, one or more of force detector 210, orientation determiner 212, distance determiner 214, and/or command generator 216, may be combined together and/or as a part of other components of system 200. For instance, in a custom hardware implementation, processor 204, memory 206, and inking manager 208, along with one or more other components, may comprise an integrated circuit. In some embodiments, less than all of the components of inking manager 208 illustrated in FIG. 2 may be included. In software implementations, one or more components of inking manager 208 may be stored in memory 206 and are executed/executable by processor 204.

Force detector 210 may be configured to receive inputs, via an input interface of interface 224, from a force sensor of touch instrument 202, such as force sensor 122 of FIG. 1C. In embodiments, the inputs are generated by interaction with a tip of a touch instrument via a touch interface of a touch device. For instance, touch instrument 102 of FIG. 1B (of which touch instrument 202 may be an embodiment) is shown as interfacing with touch device 104 to generate an input at a force sensor. Force detector 210 may be configured to determine characterization information or characteristics of the touch instrument interaction with the touch interface, e.g., a force applied, and to provide indicia of such information to force detector 210 via interface 226. Force detector 210 may determine or quantify the amplitude of force applied via the information.

Orientation determiner 212 may be configured to determine an orientation of touch instrument 202 with respect to a touch device, such as touch device 104 of FIGS. 1A-1B. For instance, orientation determiner 212 may be configured to receive information, such as energies, related to communication signals from a touch device via interface 226 and/or antenna/transceiver logic 222, and determine an orientation of touch instrument 202 therefrom. Indicia of communication signal energies received by antennas of touch instrument 202 may be provided to and received by orientation determiner 212. Because each antenna of touch instrument 202 has a known position and a known orientation within touch instrument 202, orientation determiner 212 is configured to determine orientations of touch instrument 202 with respect to a touch device based on varying communication signal energies received at each of the antennas. In some embodiments, differences in durations of signal flight prior to reception by antennas may also be used in determining orientations.

Distance determiner 214 may be configured to determine a distance between touch instrument 202 and a touch device such as touch device 104 of FIGS. 1A-1B. For example, distance determiner 214 may be configured to determine the distance based on an orientation determined by orientation determiner 212 and on information, such as energies, related to communication signals from a touch device received by touch instrument 202 via interface 226 and/or antenna/transceiver logic 222. That is, given a determined orientation and communication signal energies at such an orientation, a distance may be determined by distance determiner 214. In some embodiments, differences in durations of signal flight prior to reception by antennas may also be used in determining distances.

Command generator 216 may be configured to generate commands for activating and deactivating inking operations at a touch device such as touch device 104 of FIGS. 1A-1B. For example, an activation command or a deactivation command for inking operations at a touch device may be generated by command generator 216 based at least on a distance determined by distance determiner 214, as described in further detail herein. Commands may include information related to the type of inking operation to be performed, the location of touch instrument 202 relative to the touch device or its digitizer, the orientation of the touch instrument 202, etc.

In embodiments, one or more components and/or sub-components of touch instrument 202 may be included in a touch device, such as touch device 104 of FIGS. 1A-1B, to perform corresponding functions therein.

Accordingly, touch instrument 202 and inking manager 208 may operate in various ways for uplink-based zero activation force. Additional details regarding touch instrument 202, as well as inking manager 208 and its components, are provided below.

Figure 3:
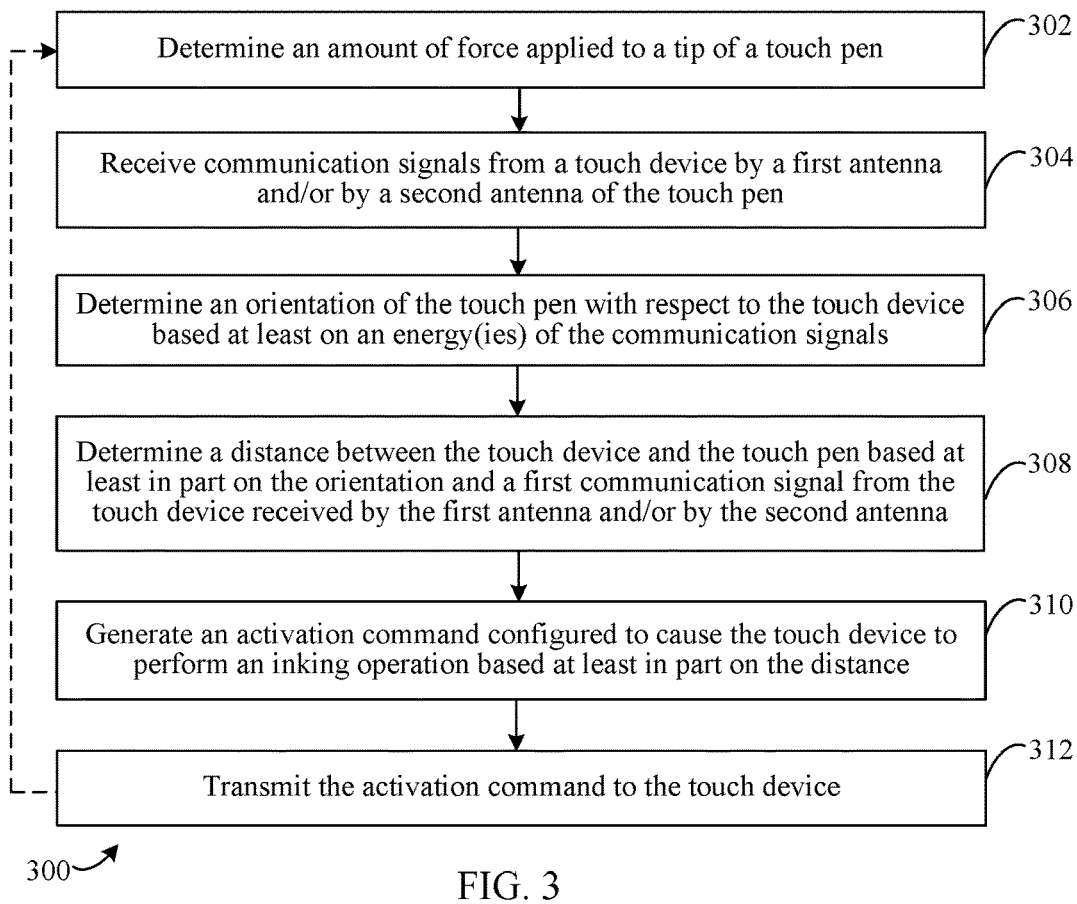
FIG. 3 shows a flowchart for uplink-based zero activation force, in accordance with an example embodiment.

For instance, FIG. 3 shows a flowchart 300 for uplink-based zero activation force, according to an example embodiment. Touch instrument 202 and inking manager 208 may operate according to flowchart 300, in embodiments. Further structural and operational examples will be apparent to persons skilled in the relevant art(s) based on the following description. Flowchart 300 is described as follows with respect to system 100A of FIG. 1A, system 100B of FIG. 1B, system 100C of FIG. 1C, and system 200 of FIG. 2.

Flowchart 300 begins at step 302. In step 302, an amount of force applied to a tip of a touch pen is determined. For example, force detector 210 may be configured to determine an amount of force applied to the tip of touch instrument 102, e.g., a touch pen. As shown in FIG. 1C, hardware-based force sensor 122 may include antenna 126a which may also function as a tip of touch instrument 102. When force 120, shown in FIG. 1B, is applied to the tip of touch instrument 102, the tip is pressed against sensor portion 124 and indicia of the force applied is provided to inking manager 108 (also shown as inking manager 208 in FIG. 2). Force detector 210 may be configured to determine or quantify the force applied at the tip based on the indicia from sensor portion 124.

In embodiments, prior to performing step 302, a calibration of the touch instrument may be performed.

In step 304, communication signals are received from a touch device by a first antenna and/or by a second antenna of the touch pen. For instance, communication signals may be transmitted by antennas of digitizer 106 (shown in FIG. 1B) and received by one or more antennas, such as antenna 126a, antenna 126b, and/or antenna 126c (shown in FIG. 1C). Antenna/transceiver logic 222 and/or interface 226 may be configured to receive indicia of the received communication signals and provide related information/data to orientation determiner 212. Antenna/transceiver logic 222 may be configured to determine respective energies of the communication signals received at each of the antennas based on the information/data, according to embodiments. Communication signals may comprise different types of signals and protocols as discussed in further detail below.

In step 306, an orientation of the touch pen with respect to the touch device is determined based at least on an energy(ies) of the communication signals. For example, orientation determiner 212 may be configured to determine an orientation of touch instrument 102 (i.e., a touch pen in this embodiment) based on information associated with the received communication signals of step 304 above. In embodiments, orientation determiner 212 may be configured to determine the orientation by determining the energies of the received signals at each antenna based on the indicia or information/data in step 304, or may be configured to receive an indication of the energies determined by antenna/transceiver logic 222 from step 304 and determine the orientation based on the indication of the energies. Because energies for a communication signal received by an antenna differ based on the angle of touch instrument 102 with respect to touch device 104 and digitizer 106, orientation determiner 212 may determine an orientation of touch instrument 102 based on the differences in energies in conjunction with the known positions and orientations of the antennas in touch instrument 102. In other words, energies vary based on antenna capacitance values for different orientations of touch instrument 202 with respect to antennas of a touch device's digitizer, thus, determined combinations of communication signal energies can be determined as corresponding to a specific orientation. Additional details regarding orientation determinations are discussed in further detail below.

In step 308, a distance between the touch device and the touch pen is determined based at least in part on the orientation and a first communication signal from the touch device received by the first antenna and/or by the second antenna. For instance, distance determiner 214 may be configured to determine the distance between touch instrument 102 (e.g., at the tip or the opposite end ("tail") where antenna 126c is located) and touch device 104. Distance determiner 214 may be configured to determine the distance based at least on the orientation of touch instrument 102 determined in step 306 by orientation determiner 212 and the energies of the received communication signals in either of step 304 or step 306.

Distances may be determined based on orientation and energies in embodiments to differentiate scenarios in which the same energy at an antenna may correspond to different distances due to antenna capacitance in different orientations, as described in further detail below. Accordingly, distance determiner 214 may determine the distance corresponding to the orientation and the energies of the received communication signals.

In step 310, an activation command configured to cause the touch device to perform an inking operation is generated based at least in part on the distance. For example, command generator 216 may be configured to generate a command based at least in part on the distance determined in step 308 by distance determiner 214. In embodiments, a determined distance of zero, or approximately zero, in step 308 may indicate that touch instrument 102 is in contact with touch device 104. Therefore, command generator 216 is configured to generate an activation command for touch device 104 to perform an inking operation based on the distance indicating the contact is occurring.

In step 312, the activation command is transmitted to the touch device. For instance, command generator 216 is configured to provide the command generated in step 310 above to interface 226 and/or antenna/transceiver logic 222 for provision of the command to touch device 104 via one or more of antenna 126a, antenna 126b, and/or antenna 126c. Transmission of the command may be based on any type of communication signal type/protocol used between touch instruments and touch devices.

In embodiments, activation commands may also be based on force applied to the tip of the touch instrument. For example, as illustrated in FIG. 1B, force 120 may be applied by a user to touch instrument 102. Force sensor 122 and force determiner 210, as noted in step 302 above, may be configured for determinations or quantifications of applied force 120, where a positive force above a specific threshold indicates that contact of touch instrument 102 with touch device 104 occurs. Command generator 216 may also be configured to generate an activation command for inking operations based on the force, and activation commands may be specific to the magnitude of force 120, as described further herein.

Activation commands may also include other information in addition to instructions for performing inking operations. This other information may include, without limitation, a location of the tip or the tail of the touch instrument relative to the touch device, a type of inking operation to be performed (e.g., full inking, shading, erasing, etc.), and/or the like.

From step 312, flowchart 300 may return to step 302, or step 304 in embodiments, and repeat the steps described above, e.g., through step 308, or through step 312 for different inking operations, in addition to providing updates to the touch device for force applied, location of the touch instrument, etc. When the distance and/or force applied indicates that the touch instrument is hovering above the touch device, i.e., there is no contact between the two, a command to cease or prohibit inking operations may be provided to the touch device from the touch instrument.

Figure 4:
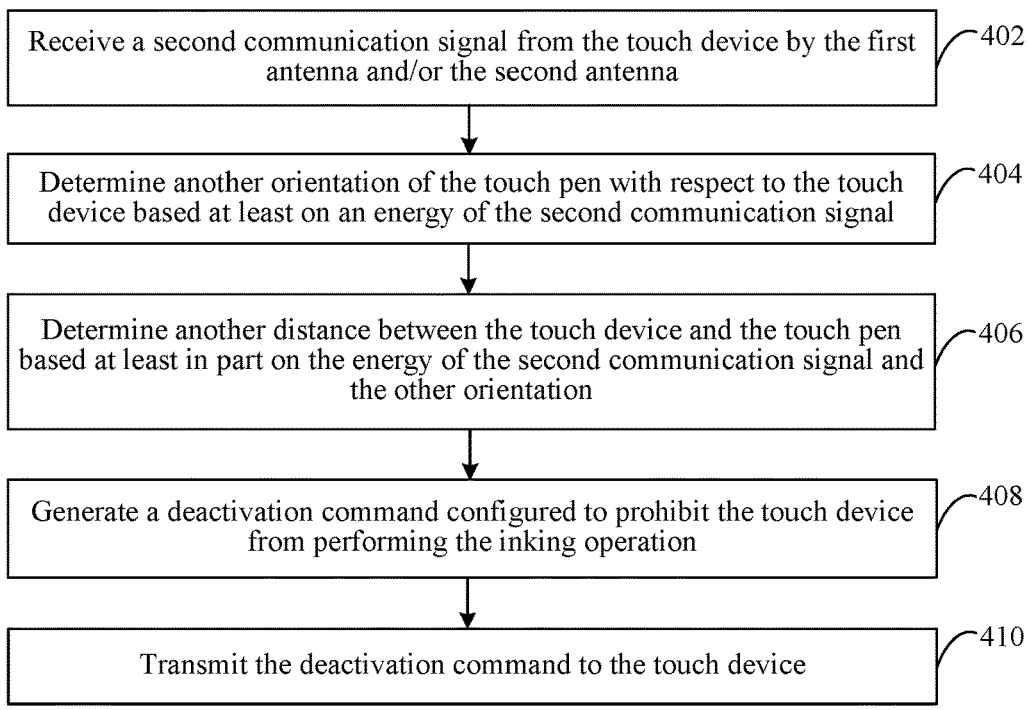
FIG. 4 shows a flowchart for uplink-based zero activation force, in accordance with an example embodiment.
Figure 5A:
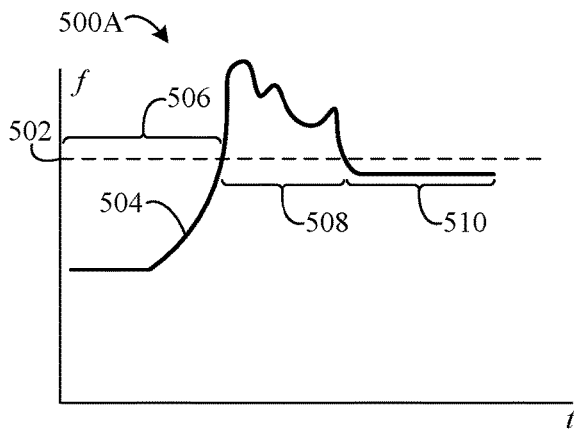
Figure 5B:
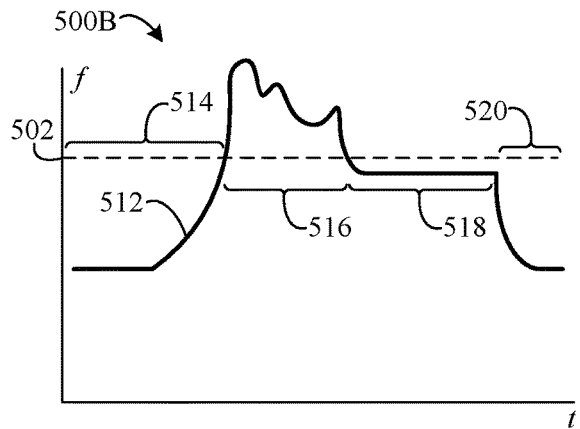
Figure 5C:
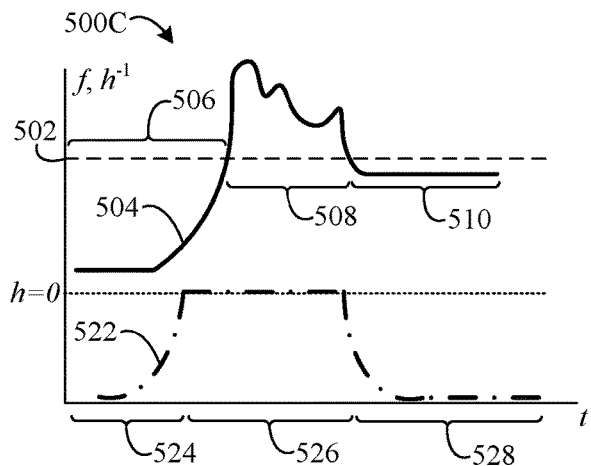
Figure 5D:
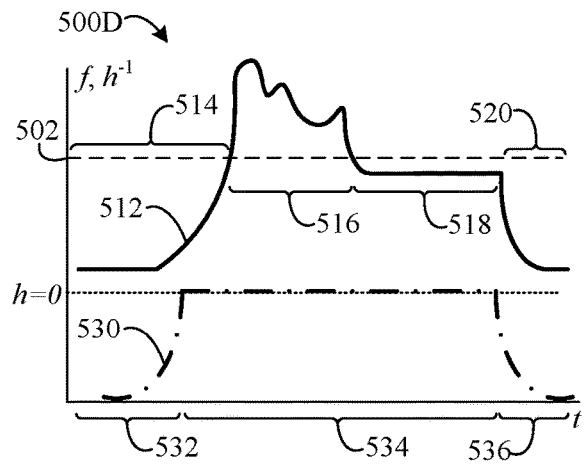

For instance, FIG. 4 shows a flowchart 400 for uplink-based zero activation force, according to an example embodiment. Touch instrument 202 and inking manager 208 of FIG. 2 may operate according to flowchart 400, in embodiments. Further structural and operational examples will be apparent to persons skilled in the relevant art(s) based on the following description. Flowchart 400 may be an embodiment of flowchart 300 of FIG. 3, and is described as follows with respect to system 100A of FIG. 1A, system 100B of FIG. 1B, system 100C of FIG. 1C, and system 200 of FIG. 2.

Flowchart 400 begins at step 402. In step 402, a second communication signal is received from the touch device by the first antenna and/or by the second antenna of the touch pen. For instance, as noted above, communication signals may be transmitted by antennas of digitizer 106 and received by antenna 126a, antenna 126b, and/or antenna 126c. Antenna/transceiver logic 222 and/or interface 226 may be configured to receive indicia of the received communication signals and provide related information/data to orientation determiner 212 for a second communication signal subsequent to the received first communication signal described above for flowchart 300. Again, antenna/transceiver logic 222 may be configured to determine respective energies of the communication signals received at each of the antennas based on the information/data, according to embodiments.

In step 404, another orientation of the touch pen with respect to the touch device is determined based at least on an energy of the second communication signal. For example, orientation determiner 212 may be configured to determine the other orientation of touch instrument 102 based on information associated with the received second communication signal. As an example, non-limiting scenario, a user may lift a touch instrument above a touch device when the user finishing a particular inking operation. Thus, the orientation of the touch instrument may change. In embodiments, orientation determiner 212 may be configured to determine the other orientation by determining the energies of the received second signal at each antenna, or may be configured to receive an indication of the energies determined by antenna/transceiver logic 222 from step 402 and determine the other orientation based thereon.

In step 406, another distance between the touch device and the touch pen is determined based at least in part on the other orientation and the energy of the second communication signal. For instance, distance determiner 214 may be configured to determine the other distance between touch instrument 102 and touch device 104. Continuing with the example scenario noted in step 404, when the user lifts the touch instrument above the touch device, the distance between the two changes. Distance determiner 214 may be configured to determine the distance based at least on the other orientation of touch instrument 102 determined by orientation determiner 212 and the energies of the received second communication signal.

In step 408, a deactivation command configured to prohibit the touch device from perform the inking operation is generated. For example, command generator 216 may be configured to generate the deactivation command based at least in part on the other distance determined in step 406 by distance determiner 214. In embodiments, a determined other distance that is greater than zero, or greater than a threshold that approximates zero, in step 306 may indicate that touch instrument 102 is not in contact with touch device 104, but rather is hovering above touch device 104. Therefore, command generator 216 is configured to generate a deactivation command for touch device 104 to prohibit the inking operation from being performed based on the distance indicating no contact is occurring. In embodiments, the deactivation command may also cause touch device 104 to display a cursor.

In step 410, the deactivation command is transmitted to the touch device. For instance, command generator 216 is configured to provide the deactivation command generated in step 408 above to interface 226 and/or antenna/transceiver logic 222 for provision of the command to touch device 104 via one or more of antenna 126a, antenna 126b, and/or antenna 126c. Transmission of this command may be based on any type of communication signal type/protocol used between touch instruments and touch devices.

Subsequent to step 410 of flowchart 400, a touch instrument may perform one or more steps of flowchart 300.

Additionally, as similarly described above for flowchart 300 for generation of activation commands, deactivation commands may also be based at least in part on a force applied to the tip of the touch instrument. Accordingly, flowchart 400 may include an additional step similar to step 302 of flowchart 300 in which another amount of force applied to a tip of a touch pen is determined, e.g., by force detector 210 which may be configured to determine an amount of force applied to the tip of touch instrument 102, which may be the touch pen referenced for flowchart 400. For example, if a force such as force 120 of FIG. 1B with an amplitude that is zero, or that is less than an inking threshold, is determined at the tip of touch instrument 102, it may be determined that contact is not being made with touch device 104, and that touch instrument 102 is hovering. In such a case, a deactivation command may be generated in step 410 by command generator 216. It should be noted, however, that distance may be used in conjunction with force for generation of a deactivation command for the additional step described immediately above.

Moreover, in embodiments, the distance determination may override the force determination for the generation of activation commands and/or deactivation commands with respect to flowchart 300 and/or flowchart 400. These embodiments are described in further detail below with reference to FIGS. 5A-5D.

FIGS. 5A, 5B, 5C, and 5D respectively show diagrams 500A, 500B, 500C, and 500D of force characteristics and distance for uplink-based zero activation force, in accordance with an example embodiment. For diagrams 500A and 500B, a force ($f$) is shown for touch instrument 102 with respect to touch device 104 of FIGS. 1A-1C is depicted against time (t), and for diagrams 500C and 500D, force (f) and an inverse height ($h^{-1}$) are shown for touch instrument 102 with respect to touch device 104 are depicted against time (t).

For a prior-solution touch pen to discriminate between hovering (i.e., no contact with a touch device) and inking (i.e., contact), only a force sensor coupled to the tip of the touch pen is utilized. One issue that arises with this approach is that the measured force may not return exactly to its baseline after an inking operation when the touch pen is lifted above the touch device to hover. This may be caused by mechanical imperfections in the touch pen, friction, wear on the force sensor, contaminants in the sensor mechanism, and/or the like. For these scenarios, a higher value for an inking threshold may be used for touch instrument operation, therefore increasing the required activation force for inking. For instance, the scenarios illustrated in diagram 500A and diagram 500B provide examples of this behavior and issues arising therefrom.

Diagram 500A shows a plot 504 for force applied using a touch instrument with a touch device, e.g., touch instrument 102 and touch device 104 of FIGS. 1A-1C. Plot 504 is referenced against an inking threshold 502 above which inking operations are performed and below which inking operations are not performed. As shown, during a period 506, the force for plot 504 is below inking threshold 502 and no inking takes place, but as the transition into a period 508 occurs, the force exceeds inking threshold 502 and inking is performed. When plot 504 enters a period 510, the force of plot 504 is approximately equal to (shown as slightly below) inking threshold 502. In this example, while the force of plot 504 is approximately equal to inking threshold 502, the value of the force is less than inking threshold 502, and thus a hover is determined and inking does not occur. It should be noted that the force of plot 504 does not return to its initial value that is well below inking threshold 502, and this may be due to one or more factors noted above. Consequently, in this example, the touch pen will not ink in a shading mode.

Considering diagram 500B, a plot 512 for force applied using a touch instrument with a touch device is illustrated. Plot 512 is also referenced against inking threshold 502. In diagram 500B, a distinction in inking operations is recognized in which a force approximately equal to inking threshold 502 indicates that light inking, or shading, is to be performed. As shown, during a period 514, the force for plot 512 is below inking threshold 502 and no inking takes place, but as the transition into a period 516 occurs, the force exceeds inking threshold 502 and inking is performed, as similarly described in diagram 500A. However, when plot 512 enters a period 518, the force of plot 504 is approximately equal to inking threshold 502. In this example, because the force of plot 504 is approximately equal to inking threshold 502, shading will be performed during period 518. As plot 512 transitions into a period 520, the force of plot 504 returns to its initial value where it is correctly sensed that no force is applied.

In other words, for touch pens and touch devices that support light inking or shading, irregularities in the behaviors of the force sensor bring about scenarios that prevent a distinction from being made between hovering and light inking/shading. That is, a user may experience inking operations while hovering, and a user may also experience no inking when light inking/shading is desired. The embodiments herein remedy and/or eliminate these issues via uplink-based zero activation force.

For example, diagram 500C shows a plot 522 for an inverse height value of touch instrument 102, according to the embodiments herein. Plot 522 is illustrated alongside plot 504, with its associated periods of time, and inking threshold 502 of diagram 500A, for reference. As shown, the distance (i.e., the inverse of height ($h^{-1}$)), between touch instrument 102 and touch device 104 indicates hovering, but decreases from the initial time t in plot 522 during a period 524 as touch instrument 102 approaches touch device 104 for inking. At the transition from period 524 to a period 526, the distance is zero, or approximately zero, and a command may be generated by touch instrument 102 to cause touch device 104 to perform an inking operation. As can be seen, period 526 corresponds with the increase of force detected by touch instrument 102 at the end of period 506 and during period 508. It should be noted, however, that the force of plot 504 is lower at the beginning of period 526, where inking is initiated based on distance according to the described embodiments, than the force of plot 504 at the beginning of period 508 which relies on a force sensor alone. While the distance is zero during period 526, inking is performed. At the start of period 528, which corresponds to period 510 of diagram 500A, the distance increases as touch instrument 102 hovers above touch device 104.

Accordingly, a command may be generated to prohibit touch device 104 from inking. It should be noted that in diagram 500C, the force value for plot 504 in period 510 has not returned to a normal baseline for hovering. Yet, despite this issue with the force sensor, it can be accurately determined that touch instrument 102 is hovering based on the distance determined, according to the embodiments herein for uplink-based zero activation force. That is, any ambiguity introduced by malfunctioning force sensors for determining light inking versus hovering is resolved.

Diagram 500D shows a plot 530 for an inverse height value of touch instrument 102, according to the embodiments herein. Plot 530 is illustrated alongside plot 512, with its associated periods of time, and inking threshold 502 of diagram 500B, for reference. As shown similarly to diagram 500C, the distance (i.e., height ($h^{-1}$)), between touch instrument 102 and touch device 104 in diagram 500D indicates hovering, but decreases from the initial time tin plot 530 during a period 532 as touch instrument 102 approaches touch device 104 for inking. At the transition from period 532 to a period 534, the distance is zero, or approximately zero, and a command may be generated by touch instrument 102 to cause touch device 104 to perform an inking operation. As can be seen, period 526 corresponds with the increase of force detected by touch instrument 102 at the end of period 514 and during periods 516 and 518. It should be noted, however, that the force of plot 512 is lower at the beginning of period 534, where inking is initiated based on distance according to the described embodiments, than the force of plot 512 at the beginning of period 508 which relies on a force sensor alone.

While the distance is zero during period 534, inking is performed. Additionally, when the force of plot 512 transitions from above inking threshold 502 (full inking during period 516) to just below, or approximately equal to, inking threshold 502 (light inking/shading during period 518), the distance indicated by plot 530 remains at zero. Thus, different inking operations may be performed based on changes in force of plot 512 while the distance is zero, indicating contact between touch instrument 102 and touch device 104. At the start of period 536, the distance increases above zero for plot 530 as touch instrument 102 hovers above touch device 104, and inking is prohibited.

Again, any ambiguity introduced by malfunctioning force sensors for determining light inking versus hovering is resolved.

Accordingly, by utilizing distance between touch instruments and touch devices for uplink-based zero activation force, the accuracy for enabling inking operations and prohibiting inking operations is improved, even when force sensors to touch instruments do not properly function. Furthermore, touch instruments may function for inking operations in the absence of force sensor all together. That is, determining distances through uplink-based zero activation force, utilizing communication signals and their energies, allows for improvements to touch instrument performance and functionality. Additional details regarding distance determinations and disambiguation are discussed below.

FIGS. 6A and 6B will now be described. FIGS. 6A and 6B respectively show diagrams of an orientation 600A and an orientation 600B with signal energies received by touch instrument 102 of FIGS. 1A-1C for uplink-based zero activation force, in accordance with an example embodiment. For orientation 600A and orientation 600B in FIGS. 6A-6B, touch instrument 102 and touch device 104 of FIGS. 1A-1C are again depicted. Orientation 600A and orientation 600B illustrate two example orientations of touch instrument 102 with respect to touch device 104.

In orientation 600A, instrument 102 is held at an angle A 604 above the plane of touch device 104. Angle A 604 is exemplary shown as a 90 degree angle such that touch instrument 102 is perpendicular to touch device 104. Touch instrument 102 hovers above touch device 104 at a distance 606, and a first energy of a communication signal 602 may be detected by an antenna(s) of touch instrument 102.

In orientation 600B, instrument 102 is held at an angle B 610 above the plane of touch device 104. Angle B 610 is exemplary shown as an angle that is less than 90 degrees, e.g., an angle of 60 degrees, 45 degrees, 30 degrees, etc., such that touch instrument 102 is not perpendicular to touch device 104. Touch instrument 102 hovers above touch device 104 at a distance 612, and a second energy of a communication signal 608 may be detected by an antenna(s) of touch instrument 102.

While writing/inking, a user may lift touch instrument 102 to a distance away from touch device 104. Distances may be realized as a few millimeters or less, and therefore the distance extractions based on the communication signal energies need to be very accurate. Accordingly, due to the capacitance of the antennas of touch instrument 102 described above, determining the tilt angle of the orientation for touch instrument 102 is important to calculate the distance accurately.

In orientation 600A and orientation 600B, as shown, the combination of distance 606 with the value of angle A 604 result in the same energy value for the first energy of the communication signal 602 received at the tip of touch instrument 102 as the second energy of the communication signal 608 at distance 612 with the value of angle B 610. In other words, different combinations of orientation and distance may provide for the same value of received signal energy. The reason is that the signal is function of the capacitance between the tip of touch instrument 102 to touch device 104, and capacitance is function of area and distance. A touch instrument that is tilted to a non-perpendicular orientation exposes more area of the antenna in the tip to the screen than a touch instrument at a 90 degree angle. In other words, in a tilt angle orientation range of zero to 90 degrees, smaller angles correspond to greater energies received.

Thus, a single antenna for a touch instrument will not be accurate enough to determine distances for uplink-based zero activation force using communication signal without force determinations, in embodiments.

Accordingly, embodiments herein provide for two or more antennas in touch instruments to achieve accurate and unambiguous uplink-based zero activation force distance determinations. As described above with respect to flowchart 300 of FIG. 3 and flowchart 400 of FIG. 4, the tilt angle for an orientation of a touch instrument is determined based on energies of a communication signal received by antennas of the touch instrument, and then distance is determined based on the orientation and the energies, as described in further detail with respect to FIG. 7 and FIG. 8.

For instance, FIG. 7 shows a diagram of a system 700 for distance calculation based on orientation and signal energy received by the touch instruments of FIGS. 1A-1C for uplink-based zero activation force, in accordance with an example embodiment. For system 700, touch instrument 102 and touch device 104 of FIGS. 1A-1C are again depicted.

FIG. 8 shows a flowchart 800 for uplink-based zero activation force, in accordance with an example embodiment. Touch instrument 202 and inking manager 208 of FIG. 2 (as embodiments of touch instrument 102 and inking manager 108 of FIGS. 1A-1C) may operate according to flowchart 800, in embodiments. Further structural and operational examples will be apparent to persons skilled in the relevant art(s) based on the following description. Flowchart 800 may be an embodiment of flowchart 300 of FIG. 3 and/or flowchart 400 of FIG. 4. Flowchart 800 is described as follows with respect to system 100A of FIG. 1A, system 100B of FIG. 1B, system 100C of FIG. 1C, and system 200 of FIG. 2.

In FIG. 7, system 700 includes touch instrument 102, having inking manager 108 (also contemplated as inking manager 208), antenna 126a, antenna 126b, and antenna 126c described above, as well as touch device 104. Touch instrument 102 is illustrated as having an orientation with respect to touch device 104, denoted by x-y-z axes where the x-y plane corresponds to the surface of plane of touch device 104 (and digitizer 106 thereof), and the z-axis corresponds to the distance between touch instrument 102 and touch device 104.

As shown, the orientation of touch instrument 102 may include a tilt angle T 704 between the x-y axis plane and a vector v 706 corresponding to touch instrument 102. Likewise, touch instrument 102 may be held at a distance 708 from touch device 104, where distance 704 may be zero millimeters or more.

Referring again to FIG. 8, flowchart 800 begins at step 802. In step 802, a first energy of the first communication signal from the first antenna is determined. For instance, antenna/transceiver logic, e.g., as described above for inking manager 208, may be configured to determine the first energy of the first communication signal from touch device 104 received by a first antenna of touch instrument 102. In embodiments, any one of antenna 126a, antenna 126b, or antenna 126c may be the first antenna. The energy determined in step 802 (i.e., the first energy) corresponds to tilt angle T 704 due to antenna capacitance, as described herein.

Additionally, the first communication signal may be of any signal type/protocol. For example, a signal 702a may be signal that is utilized for information exchange between touch instrument 102 and the digitizer of touch device 104, a signal 702b may be a touch sensing signal for touch determinations between touch instrument 102 and touch device 104 (e.g., in embodiments, the cycle of the touch instrument may be synchronize with that of a digitizer of the touch device, therefore the pen knows the touch signals positions in the cycle), and a signal 702c may be a display signal for content on a screen of touch device 104 used for touch sensing that may be detected and received by antennas of touch instrument 102. In embodiments, any of signal 702a, signal 702b, or signal 702c may correspond to the first communication signal.

In step 804, a second energy of the first communication signal from the second antenna is determined. For example, antenna/transceiver logic, e.g., as described above for inking manager 208, may be configured to determine the second energy of the first communication signal from touch device 104 received by a second antenna of touch instrument 102. In embodiments, any other one of antenna 126a, antenna 126b, or antenna 126c may be the second antenna. Again, the energy determined in step 802 (i.e., the second energy) corresponds to tilt angle T 704 due to antenna capacitance, as described herein.

In step 806, the tilt angle is determined based on a ratio of the first energy to the second energy. For instance, the first energy determined in step 802 and the second energy determined in step 804 may be compared, e.g., as a ratio, by an orientation determiner, such as described above for inking manager 208. The ratio determined may be compared against a lookup table, e.g., lookup table 224, or other data structure having stored therein one or more entries with ratios of energies for different antenna combinations that correspond to tilt angle T 704 of the orientation for touch instrument 102. In some embodiments, an orientation determiner may be configured to dynamically calculate tilt angle T 704 using mathematical relationships of the relative locational relationships between the antennas and the ratio of energies. In such embodiments, lookup table 224 may be updated with the determined angle and the ratio. It is also contemplated herein that tilt angle T 704 may be determined or confirmed using an accelerometer (not shown) of touch instrument 102. In some embodiments where using a receiver/transmitter per antenna is implemented, where $E_{tip}$ is energy received in the tip, and for $E_{tilt}$ and $E_{tail}$ are respective energies for the tilt antenna and tail antenna. The pen tilt angle with respect to the screen can be extracted using the ratio between $E_{tip}$ and $E_{tilt}$, e.g., $\theta$=function ($E_{tip}$, $E_{tilt}$). In an embodiment for pen height above the screen, the received energy $E_{tip}$, $E_{tilt}$ is function of the height and the tilt angle $\theta$, and h=function ($E_{tip}$, $E_{tilt}$, $E_{tail}$, $\theta$). In some embodiments, finite element simulations of electrostatic fields for specific geometries in different heights/distances and angles may be used to verify relationships by measuring the signals while holding the pen with at different angles and heights.

In step 808, the distance is determined based at least on the tilt angle and one or more of the first energy or the second energy. For example, tilt angle T 704 determined in step 806 and at least one of the first energy or the second energy determined in step 802 and step 804, respectively, may be utilized, e.g., by a distance determiner, such as described above for inking manager 208, to determine distance 708 between touch instrument 102 and touch device 104. The orientation, e.g., tilt angle T 704, and one or more of the first or second energies may be compared against a lookup table, e.g., lookup table 224, or other data structure having stored therein one or more entries with distances corresponding to the orientation and energy(ies) for touch instrument 102. In some embodiments, a distance determiner may be configured to dynamically calculate distance 708 using mathematical relationships of the relative locational relationships between the antennas, the orientation, and the of energy(ies). In such embodiments, lookup table 224 may be updated with the determined distance and the corresponding orientation and energy(ies).

It is also contemplated herein that flowchart 800 may be expanded to include an additional step(s) such that three or more antennas are used to determine distance 708, thereby increasing accuracy of the distance determination.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including system 100A of FIG. 1A, system 100B of FIG. 1B, system 100C of FIG. 1C, and system 200 of FIG. 2, and system 700 of FIG. 7, along with any components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100A of FIG. 1A, system 100B of FIG. 1B, system 100C of FIG. 1C, and system 200 of FIG. 2, and system 700 of FIG. 7, along with any components and/or subcomponents thereof, as well as the flowcharts/flow diagrams described herein, including portions thereof, and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

FIG. 10 depicts an exemplary implementation of a computing device 1000 in which embodiments may be implemented. For example, embodiments described herein may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems and/or game consoles, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002.

Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as system 100A of FIG. 1A, system 100B of FIG. 1B, system 100C of FIG. 1C, and system 200 of FIG. 2, and system 700 of FIG. 7, along with any components and/or subcomponents thereof, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

While embodiments described in the Sections above may be described in the context of touch instruments, e.g., a touch pen, stylus, etc., and touch inputs via touch interfaces, the embodiments herein are not so limited and may also be applied through other input devices.

Additionally, the described embodiments do not exist in software implementations for enhancements and improvements to touch instruments for uplink-based zero force activation. Conventional solutions lack the ability to determine distances using antennas and measuring signal energies in touch instruments, as well as the ability to override indications of inking operations to be performed based on malfunctioning force sensors. Likewise, conventional solutions lack the ability to fuse force sensor information with distances determined through antenna-sensed energies to improve functioning of touch instruments for different types of inking operations.

Furthermore, while embodiments are described generally with respect to inking operations using the tip of a touch instrument, e.g., full inking and light inking/shading, the embodiments herein also encompass inking operations that utilize the distance between the tail of touch instruments, e.g., erasing, smudging, blending, and/or the like.

Still further, the embodiments herein provide for touch instruments configured to calculate received signal energies within the touch instruments themselves. Embodiments may be further improved for performance though utilization of custom hardware implementations in the touch instruments. For example, touch instruments according to embodiments receive communication signals with a much lower signal-to-noise ratio (SNR) than a digitizer's SNR, in some cases orders of magnitude lower, due to very low loading on the touch instrument antennas, whereas digitizer antennas run in a grid across all of the screen of touch devices (e.g., a touch instrument's antennas may be able to receive signals from a touch device at distances that are orders of magnitude greater than what a touch device is able to achieve). Also, the lack of display noise or power supply noise in touch instruments that are battery operated improves performance of functions when done by touch instruments. Thus, accuracy of measurements is improved and power is saved though the uplink-based zero activation force embodiments. Real sensor fusion is also enabled between the force sensor and the antennas receiving signals of various energies. Still further yet, calculations and determinations herein may be performed in real time, or approximately real time, because delay over the communication link between touch instruments and touch devise is eliminated, and this enables faster responses to changes. For instance, a refresh rate of a touch instrument according to embodiments may be, as an example, 3 ms or less, and therefore timely determinations of touch instrument states, characteristics, orientations, distances, etc., are required.

The additional examples and embodiments described in this Section may be applicable to examples disclosed in any other Section or subsection of this disclosure.

A system in a touch instrument that interfaces with a touch device is described herein. The system may be configured and enabled in various ways for uplink-based zero activation force, as described herein. The system includes a first antenna configured to receive communication signals from the touch device, and a second antenna electrically configured to receive the communication signals from the touch device. The system also includes a processing circuit, electrically coupled to the first antenna and to the second antenna. The processing circuit is configured to determine an orientation of the touch pen with respect to the touch device, and to determine a distance between the touch device and the touch pen based at least in part on the orientation and a first communication signal from the touch device received by the first antenna and by the second antenna. The processing circuit is also configured to generate an activation command configured to cause the touch device to perform an inking operation based at least in part on the distance. At least one of the first antenna or the second antenna is configured to transmit the activation command to the touch device.

In an embodiment of the system, the first antenna and the second antenna are each configured to receive a second communication signal from the touch device. In the embodiment, the processing circuit is configured to determine another orientation of the touch pen with respect to the touch device, determine another distance between the touch device and the touch pen based at least in part on the second communication signal and the other orientation, and generate a deactivation command configured to prohibit the touch device from performing the inking operation. At least one of the first antenna or the second antenna is configured to transmit the deactivation command to the touch device.

In an embodiment of the system, the activation command includes information indicative of the touch pen being in contact with the touch device and an instruction that the touch device perform the inking operation at one or more locations on a display screen of the touch device corresponding to the location of the tip. In an embodiment of the system, the deactivation command includes information indicative of the touch pen hovering above the touch device and an instruction that the touch device display a cursor on the screen instead of performing the inking operation.

In an embodiment, the system includes at least one of a hardware sensor configured to determine an amount of force applied to a tip of the touch pen, the hardware sensor being electrically coupled to the first antenna, or another antenna configured to receive the communication signals from the touch device, where the processing circuit is configured to determine the distance between the touch device and the a touch pen also based at least in part on the first communication signal that is also received by the other antenna. In the embodiment of the system, the processing circuit is electrically coupled to the hardware sensor and is configured to generate at least one of the activation command or the deactivation command also based on the amount of force, or to calibrate the hardware sensor based on the amount of force and at least one of the distance or the orientation.

In an embodiment of the system, the processing circuit is configured to generate the activation command based on the first distance and the amount of force together indicating that the tip is touching the touch device, and the processing circuit is configured to generate the deactivation command based on the amount of force indicating that the tip is touching the touch device and the second distance indicating the tip is not touching the touch device.

In an embodiment of the system, the orientation includes a tilt angle where the processing circuit, to determine the distance, is configured to determine a first energy of the first communication signal from the first antenna, determine a second energy of the first communication signal from the second antenna, determine the tilt angle based on a ratio of the first energy to the second energy, and determine the distance based at least on the tilt angle and one or more of the first energy or the second energy.

A method implemented in an electronic touch instrument is also described. The method includes determining an orientation of the electronic touch instrument with respect to a touch device with which the electronic touch instrument interacts based at least on a first energy of a first communication signal from a first antenna of the electronic touch instrument. The method also includes determining a first distance between the touch device and the electronic touch instrument based at least in part on the first energy and the orientation, and based at least in part on the first distance, generating an activation command configured to cause the touch device to perform an inking operation.

In an embodiment, the method includes transmitting the activation command from the first antenna to the touch device, and transmitting location information of a tip of the electronic touch instrument from the first antenna to the touch device to cause corresponding performance of the inking operation.

In an embodiment, the method includes receiving a second communication signal from the touch device by the first antenna subsequent to said transmitting the location information. In the embodiment, the method also includes, subsequent to said receiving the second communication signal, determining another orientation of the electronic touch instrument with respect to the touch device based at least on a second energy of a second communication signal from the first antenna, determining a second distance between the touch device and the electronic touch instrument at least in part on the second energy and the other orientation, and based at least on the second distance, generating a deactivation command configured to prohibit the touch device from performing the inking operation.

In an embodiment of the method, the electronic touch instrument includes a touch pen and the tip includes a hardware sensor configured to determine an amount of force applied to the tip. In the embodiment, the method includes determining that the amount of force applied indicates that the tip is touching the touch device, performing said generating the deactivation command based at least on the second distance indicating that the tip is hovering above the touch device.

In an embodiment of the method, the electronic touch instrument includes a touch pen and the tip includes a hardware sensor configured to determine an amount of force applied thereto. In the embodiment, the method includes determining the amount of force applied to the tip, determining that the tip is touching the touch device based at least on the amount of force applied and the first distance, and subsequent to said determining that the tip is touching the touch device, performing said generating the activation command.

In an embodiment of the method, the first antenna also includes a second antenna that is configured to receive the first communication signal, the second antenna having a second energy for the received first communication signal, said determining the orientation includes a tilt angle that is based at least on a ratio of the first energy to the second energy, and said determining the first distance is also based at least on the second energy.

In an embodiment of the method, the first communication signal is at least one of an uplink communication signal that carries communication information between the electronic touch instrument and touch device, a touch communication signal that senses touches to the touch device, or a display communication signal that provides a display to of the touch device.

In an embodiment, the method includes storing in a memory of the electronic touch instrument at least one of the first distance, the first energy, or the orientation in a table that is associated with the activation command. In the embodiment, subsequent to said generating the activation command, the method includes performing at least one of a first lookup in the table of the orientation based on the first energy, or, a second lookup in the table of the activation command based on at least one of the orientation or the first energy and performing said generating the activation command based on at least one of the first look up or the second lookup.

A computer-readable storage medium having program instructions recorded thereon that, when executed by a processing circuit of an electronic touch instrument, perform a method is also described. The method includes receiving a first communication signal from a touch device with which the electronic touch instrument interacts via a first antenna, and determining an orientation of the electronic touch instrument with respect to the touch device based at least on a first energy of the first communication signal received from the first antenna. The method also includes determining a first distance between the touch device and the electronic touch instrument based at least in part on the first energy and the orientation, and generating an activation command, based at least in part on the first distance, configured to cause the touch device to perform an inking operation.

In an embodiment of the computer-readable storage medium, the method includes transmitting the activation command from the first antenna to the touch device, and transmitting location information of a tip of the electronic touch instrument from the first antenna to the touch device to cause corresponding performance of the inking operation.

In an embodiment of the computer-readable storage medium, the method includes receiving the first communication signal via a second antenna, determining the orientation also based at least on a second energy of the first communication signal from the second antenna, and determining the first distance also based at least on a second energy.

In an embodiment of the computer-readable storage medium, the first antenna and the second antenna are each configured to receive a second communication signal from the touch device. In the embodiment of the computer-readable storage medium, the method includes receiving a second communication signal from the touch device by the first antenna and by the second antenna subsequent to said generating the activation command. Subsequent to said receiving the second communication signal, the method also includes determining another orientation with respect to the touch device based at least on a third energy of the second communication signal from the first antenna and a fourth energy of the second communication signal from the second antenna, determining another distance between the touch device and the electronic touch instrument based at least in part on the other orientation and one or more of the first energy or the second energy, and generating based at least in part on the other distance a deactivation command configured to prohibit the inking operation from being performed by the touch. In the embodiment, at least one of the first antenna or the second antenna is configured to transmit the deactivation command to the touch device.

In an embodiment of the computer-readable storage medium, the electronic touch instrument includes a touch pen and the tip includes a hardware sensor configured to determine an amount of force applied thereto. In one further embodiment, the method includes determining the amount of force applied to the tip, determining that the tip is touching the touch device based at least on the amount of force applied and the first distance, and subsequent to said determining that the tip is touching the touch device, performing said generating the activation command. In another further embodiment, the method includes determining that the amount of force applied indicates that the tip is touching the touch device, and performing said generating the deactivation command based at least on the second distance indicating that the tip is hovering above the touch device.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system in a touch instrument that interfaces with a touch device, the system comprising:
   a first antenna configured to receive communication signals from the touch device;
   a second antenna electrically configured to receive the communication signals from the touch device; and
   a processing circuit, electrically coupled to the first antenna and to the second antenna, that is configured to:
     determine an orientation of the touch instrument with respect to the touch device;
     determine a distance between the touch device and the touch instrument based at least in part on the orientation and a first communication signal from the touch device received by the first antenna and by the second antenna; and generate an activation command configured to cause the touch device to perform an inking operation based at least in part on the distance that is determined by utilizing the first communication signal received by the first antenna and by the second antenna;

at least one of the first antenna or the second antenna configured to transmit the activation command to the touch device.

2. The system of claim 1, wherein the first antenna and the second antenna are each configured to receive a second communication signal from the touch device; and wherein the processing circuit is configured to:
determine another orientation of the touch instrument with respect to the touch device;
determine another distance between the touch device and the touch instrument based at least in part on the second communication signal and the other orientation; and
generate a deactivation command configured to prohibit the touch device from performing the inking operation;

wherein at least one of the first antenna or the second antenna is configured to transmit the deactivation command to the touch device.

3. The system of claim 2, wherein the activation command comprises information indicative of the touch instrument being in contact with the touch device and an instruction that the touch device perform the inking operation at one or more locations on a display screen of the touch device corresponding to the location of a tip of the touch instrument; or wherein the deactivation command comprises information indicative of the touch instrument hovering above the touch device and an instruction that the touch device display a cursor on the screen instead of performing the inking operation.

4. The system of claim 1, comprising at least one of:
a hardware sensor configured to determine an amount of force applied to a tip of the touch instrument, the hardware sensor being electrically coupled to the first antenna;
or
another antenna configured to receive the communication signals from the touch device,
wherein the processing circuit is configured to:
determine the distance between the touch device and the a touch instrument also based at least in part on the first communication signal that is also received by the other antenna.

5. The system of claim 4, wherein the processing circuit is electrically coupled to the hardware sensor and is configured to:
generate at least one of the activation command or the deactivation command also based on the amount of force; or
calibrate the hardware sensor based on the amount of force and at least one of the distance or the orientation.

6. The system of claim 5, wherein the processing circuit is configured to generate the activation command based on the first distance and the amount of force together indicating that the tip is touching the touch device; and wherein the processing circuit is configured to generate the deactivation command based on both of:
the amount of force indicating that the tip is touching the touch device, and
the second distance concurrently indicating the tip is not touching the touch device.

7. The system of claim 1, wherein the orientation includes a tilt angle;
wherein the processing circuit, to determine the distance, is configured to:
determine a first energy of the first communication signal from the first antenna;
determine a second energy of the first communication signal from the second antenna;
determine the tilt angle based on a ratio of the first energy to the second energy; and
determine the distance based at least on the tilt angle and one or more of the first energy or the second energy.

8. A method implemented in an electronic touch instrument, the method comprising:
determining an orientation of the electronic touch instrument with respect to a touch device with which the electronic touch instrument interacts based at least on a first energy of a first communication signal from a first antenna of the electronic touch instrument;
determining a first distance between the touch device and the electronic touch instrument based at least in part on the first energy and the orientation; and
based at least in part on the first distance that is determined by utilizing the first energy of a first communication signal, generating an activation command configured to cause the touch device to perform an inking operation.

9. The method of claim 8, comprising:
transmitting the activation command from the first antenna to the touch device; and
transmitting location information of a tip of the electronic touch instrument from the first antenna to the touch device to cause corresponding performance of the inking operation.

10. The method of claim 9, comprising:
receiving a second communication signal from the touch device by the first antenna subsequent to said transmitting the location information; and
subsequent to said receiving the second communication signal:
determining another orientation of the electronic touch instrument with respect to the touch device based at least on a second energy of a second communication signal from the first antenna;
determining a second distance between the touch device and the electronic touch instrument at least in part on the second energy and the other orientation; and
based at least on the second distance, generating a deactivation command configured to prohibit the touch device from performing the inking operation.

11. The method of claim 10, wherein the electronic touch instrument comprises a touch pen and the tip comprises a hardware sensor configured to determine an amount of force applied to the tip;
the method comprising:
determining that the amount of force applied indicates that the tip is touching the touch device; and performing said generating the deactivation command based at least on the second distance concurrently indicating that the tip is hovering above the touch device.

12. The method of claim 8, wherein the electronic touch instrument comprises a touch pen and the tip comprises a hardware sensor configured to determine an amount of force applied thereto;
the method comprising:
determining the amount of force applied to the tip;
determining that the tip is touching the touch device based at least on the amount of force applied and the first distance; and
subsequent to said determining that the tip is touching the touch device, performing said generating the activation command.

13. The method of claim 8, wherein the first antenna also includes a second antenna that is configured to receive the first communication signal, the second antenna having a second energy for the received first communication signal;
wherein said determining the orientation includes a tilt angle that is based at least on a ratio of the first energy to the second energy; and
wherein said determining the first distance is also based at least on the second energy.

14. The method of claim 8, wherein the first communication signal is at least one of an uplink communication signal that carries communication information between the electronic touch instrument and touch device, a touch communication signal that senses touches to the touch device, or a display communication signal that provides a display to of the touch device.

15. The method of claim 8, comprising:
storing in a memory of the electronic touch instrument at least one of the first distance, the first energy, or the orientation in a table that is associated with the activation command; and
subsequent to said generating the activation command, performing at least one of:
a first lookup in the table of the orientation based on the first energy; or
a second lookup in the table of the activation command based on at least one of the orientation or the first energy; and
performing said generating the activation command based on at least one of the first look up or the second lookup.

16. A computer-readable storage medium having program instructions recorded thereon that, when executed by a processing circuit of an electronic touch instrument, perform a method comprising:
receiving a first communication signal from a touch device with which the electronic touch instrument interacts via a first antenna;
determining an orientation of the electronic touch instrument with respect to the touch device based at least on a first energy of the first communication signal received at the first antenna;
determining a first distance between the touch device and the electronic touch instrument based at least in part on the first energy and the orientation; and
generating an activation command, based at least in part on the first distance that is determined by utilizing the first energy of the first communication signal received from the first antenna, configured to cause the touch device to perform an inking operation.

17. The computer-readable storage medium of claim 16, wherein the method comprises:
transmitting the activation command from the first antenna to the touch device; and
transmitting location information of a tip of the electronic touch instrument from the first antenna to the touch device to cause corresponding performance of the inking operation.

18. The computer-readable storage medium of claim 16, wherein the method comprises:
receiving the first communication signal via a second antenna;
determining the orientation also based at least on a second energy of the first communication signal from the second antenna; and
determining the first distance also based at least on the second energy.

19. The computer-readable storage medium of claim 18, wherein the first antenna and the second antenna are each configured to receive a second communication signal from the touch device; and
wherein the method comprises:
receiving the second communication signal from the touch device by the first antenna and by the second antenna subsequent to said generating the activation command; and
subsequent to said receiving the second communication signal:
determining another orientation with respect to the touch device based at least on a third energy of the second communication signal from the first antenna and a fourth energy of the second communication signal from the second antenna;
determining another distance between the touch device and the electronic touch instrument based at least in part on the other orientation and one or more of the first energy or the second energy; and
generating based at least in part on the other distance a deactivation command configured to prohibit the inking operation from being performed by the touch;
wherein at least one of the first antenna or the second antenna is configured to transmit the deactivation command to the touch device.

20. The computer-readable storage medium of claim 16, wherein the electronic touch instrument comprises a touch pen and the tip comprises a hardware sensor configured to determine an amount of force applied thereto; and
wherein the method comprises at least one of:
determining the amount of force applied to the tip,
determining that the tip is touching the touch device based at least on the amount of force applied and the first distance, and
subsequent to said determining that the tip is touching the touch device,
performing said generating the activation command;
or
determining that the amount of force applied indicates that the tip is touching the touch device, and
performing said generating the deactivation command based at least on a second distance concurrently indicating that the tip is hovering above the touch device.

* * * * *